US 6,622,872 B1

(12) United States Patent
Tai et al.

(10) Patent No.: US 6,622,872 B1
(45) Date of Patent: Sep. 23, 2003

(54) MICROMACHINED MEMBRANE PARTICLE FILTER USING PARYLENE REINFORCEMENT

(75) Inventors: Yu-Chong Tai, Pasadena, CA (US); Xing Yang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/187,475

(22) Filed: Nov. 6, 1998

Related U.S. Application Data

(60) Provisional application No. 60/064,807, filed on Nov. 7, 1997.

(51) Int. Cl.[7] ............................ B01D 71/02; B01D 71/06
(52) U.S. Cl. .................. 210/490; 210/500.33; 210/506; 216/2; 216/56
(58) Field of Search ................................ 210/490, 500.1, 210/500.33, 506; 427/255.393, 255.394, 579, 255.6; 216/2, 56

(56) References Cited

U.S. PATENT DOCUMENTS

| 5,067,491 A | 11/1991 | Taylor, II et al. |
| 5,141,596 A | * 8/1992 | Hawkins et al. |
| 5,609,629 A | 3/1997 | Fearnot et al. |
| 5,660,680 A | 8/1997 | Keller |
| 5,744,360 A | 4/1998 | Hu et al. |
| 5,753,014 A | 5/1998 | Van Rijn |
| 5,776,324 A | * 7/1998 | Usala |
| 5,964,991 A | * 10/1999 | Kawasaki et al. |

FOREIGN PATENT DOCUMENTS

| NL | 9301971 A | * 6/1995 |
| NL | 9401260 A | * 6/1995 |
| WO | WO 95/13860 | 5/1995 |

OTHER PUBLICATIONS

The Condensed Chemical Dictionary, ninth edition, revised by G.G. Hawley; van Nostrand Reinhold Company (1977); p. 652.

* cited by examiner

Primary Examiner—W. L. Walker
Assistant Examiner—David Sorkin
(74) Attorney, Agent, or Firm—Fish & Richardson P.C.

(57) ABSTRACT

A micromachined membrane particle filter is formed by making holes in a silicon derivative overlayer and coating over the holes with Parylene.

11 Claims, 4 Drawing Sheets

| top view (8 mm × 8mm) cross-sectional view (thickness) | hole size d (μm) or a × b (μm²) | opening factor β (%) |
|---|---|---|
| ▯ 5.3 mm ↕ 2.3 mm ↕ (2 μm + 2 × 1 μm) | 6 | 3.65 |
| (2μm) | 8 ~ 8.8 | 7.5 |
| ▯ 5.3 mm (2μm) | 10.6 | 12.5 |
| (1.1 μm + 2 × 1 μm) | 7 ~ 7.5 | 15.1 ~ 17.4 |
| (1 μm) | 11 ~ 12 | 37.3 ~ 44.4 |
| (1 μm) | 6 × 20 | 43.6 |
| (1.1 μm + 2 × 1 μm) | 2-3 × 16-17 | 11.6 ~ 18.5 |

☐ : non-filtering region  ☐ : silicon nitride
☐ : filtering region  ☐ : parylene coating

FIG. 2

MICROMACHINED MEMBRANE PARTICLE FILTER USING PARYLENE REINFORCEMENT

This application claims the benefit of the U.S. Provisional Application No. 60/064,807, filed on Nov. 7, 1997, which is incorporated herein by reference.

STATEMENT AS TO FEDERALLY SPONSORED RESEARCH

The U.S. Government may have certain rights in this invention pursuant to Grant No. N66001-96-C-8632 awarded by the U.S. Navy.

BACKGROUND

A mechanical filter can be used to remove, filter, or collect particles. This filtering and collection of particles can be used for sampling of particles, chemical detection, and/or biological cell analysis.

It is known to make such filters using micromachining techniques to form small features in a silicon wafer. For example, this has been described in C. J. M. Van Rijin and M. C. Elwenspoek, "Micro Filtration Membrane Sieve with Silicon Micro Machining for Industrial and Biomedical Applications," Proceedings of IEEE Micro Electro Mechanical Systems Workshop (MEMS'95), pp. 83–87, 1995 and G. Kittilsland and G. Stemme, "A Submicron Particle Filter in Silicon," Sensors and Actuators, A: Physical, Vol. 23, pp. 904–907, 1990. However, the present disclosure describes a different way of developing filters which has certain improved characteristics. One problem with prior micromachined filters is their overall strength.

SUMMARY

A membrane particle filter is described which uses micromachining technologies. The filters are fabricated using a substrate membrane that is perforated with holes. The holes can have different shapes, different dimensions, and different opening factors. Preferred shapes include circular, hexagonal, and rectangular, with dimensions ranging from 6–13 $\mu$m.

In a preferred mode, a layer of Parylene material is uniformly coated on the filters and on the inner surfaces of the holes in order to increase the overall strength of the filter.

Another important feature is the amount of power which is necessary to provide the desired pressure drop across the filter. Proper control of the opening size allows determining various tradeoffs, including the energy and power necessary to form the desired pressure drop. Another feature of this disclosure is that the sizes of the openings can be more specifically controlled by deposition of Parylene material.

BRIEF DESCRIPTION OF THE DRAWINGS

These and other aspects will now be described in detail with reference to the accompanying drawings, wherein:

FIG. 2 shows different results of different filtering regions;

DESCRIPTION OF THE PREFERRED EMBODIMENTS

The fabrication process for the preferred mode filter is shown in FIGS. 1A–1F. The process begins in FIG. 1A by depositing a layer of low stress LPCVD silicon nitride 100 and 102 ("SiN") at 850° C. on a silicon substrate 104. The layer 100 is preferably between a ½ and 1 $\mu$m micron thick. The material is deposited with an $SIH_2Cl_2$:$NH_3$ gas flow ratio of 4 to 1. The SiN layers 100, 102 are deposited on both sides of silicon substrate 104.

Figure 1A:
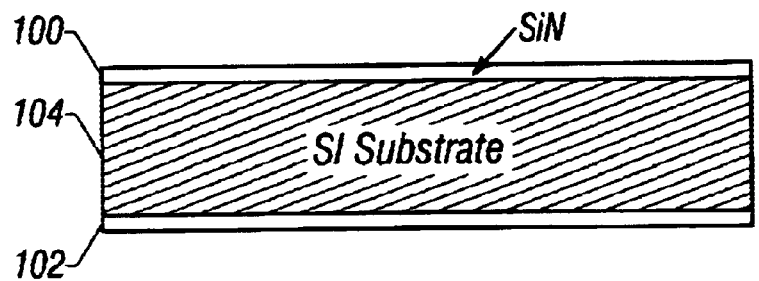
FIGS. 1A–1F show a membrane filter fabrication process.
Figure 1B:
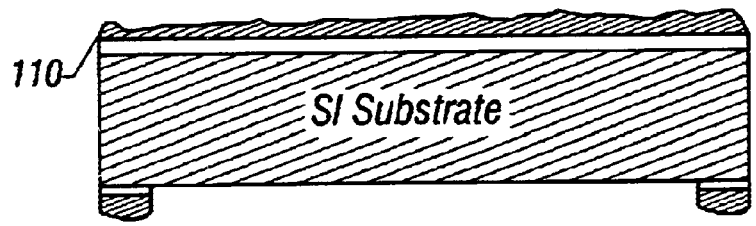

FIG. 1B shows patterning the SiN layer 102 on the backside of the silicon substrate 104. First, the desired areas to be protected are covered with photoresist layer 110. This is followed by dry etching the SiN 102 to form a pattern.

Figure 1C:
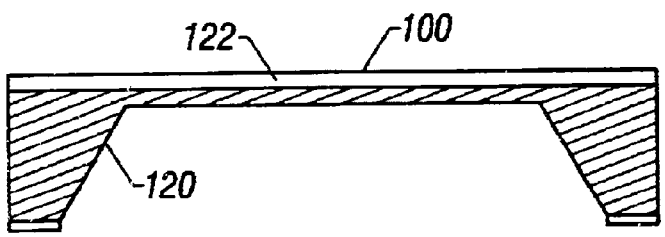

FIG. 1C shows the anisotropic etching step which uses an anisotropic etchant such as KOH. This leaves a window 120 left in the wafer, with only a thin area of the silicon wafer 122 remaining. The thin wafer area can be between 20 and 100 $\mu$m thick. The overlying silicon nitride 100 remains unchanged during this step.

Figure 1D:
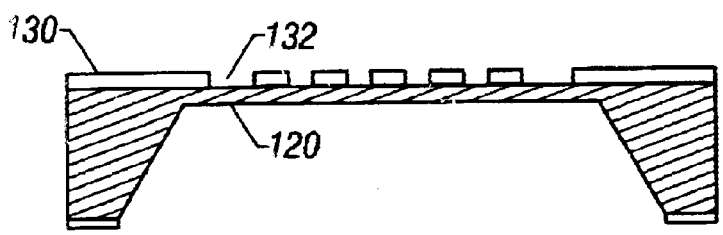
Figure 1E:
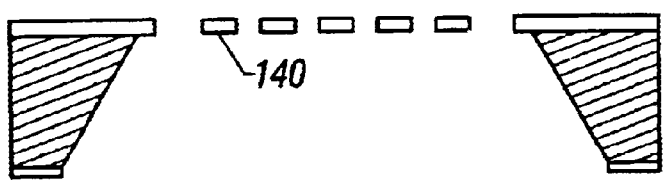
Figure 1F:
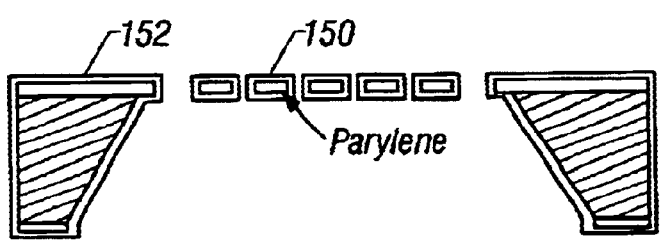

FIG. 1D shows using RIE to provide patterns 130 in the SiN layer 100. The pattern includes holes 132 into the silicon nitride layer 100. The holes can be of any desired size and shape as described above.

This is followed by placing the wafer into another anisotropic solution (for example, KOH) to remove the remaining silicon layer 120. This frees the membrane to form the unsupported membrane shown in FIG. 1E. The membrane includes unsupported silicon nitride portion 140, defining holes therebetween. These holes, however, would have low structural integrity.

Finally, a layer of Parylene is deposited over the entire wafer. Parylene is available from Specialty Coating Systems, Inc., 5707 West Minnesota Street, Indianapolis, Ind. 46241. The Parylene uniformly covers the entire wafer surface, forming Parylene overlayers 150, 152. Each of the holes therefore includes a Parylene overlayer on each of its surfaces: top surface, bottom surface, and all sides.

The layer of Parylene 150 serves three main purposes. The Parylene overlayer greatly improves the strength of the membrane filter by providing a reinforcement to the filter. Uniform deposition of Parylene also allows changing the hole size. Different hole sizes can be obtained from the same basic filter skeleton. Control of the thickness of the Parylene layer can be used to obtain these different hole sizes. For example, a 10 $\mu$m opening can be changed to a 4 $\mu$m opening by depositing 2 $\mu$m of Parylene on the entire device, forming two, 2-$\mu$m barriers at two ends of the hole. Hence, the same basic filter can have different holes sizes by changing the thickness of the Parylene layer.

Parylene is biocompatible, making the filter suitable for biological applications.

This fabrication process can be used for various membrane filters. The preferred hole shapes include circular, hexagonal, and/or rectangular. Filters as large as 8×8 square millimeters can be fabricated. The opening area ratio increases as the hole size increases. The hole size also defines the filtering threshold—the minimum size of the particles that can be blocked by the filter.

For example, a filter with a 10.6 $\mu$m diameter hole has an opening area ratio of approximately 12½%. Hexagonal holes can provide higher opening area ratios, but cause higher stress concentration in the membrane. This effectively reduces the strength of the filter. Rectangular holes can provide a large range of opening area ratio without changing the filtering threshold. One dimension of the rectangular holes must be kept constant.

Figure 3A:
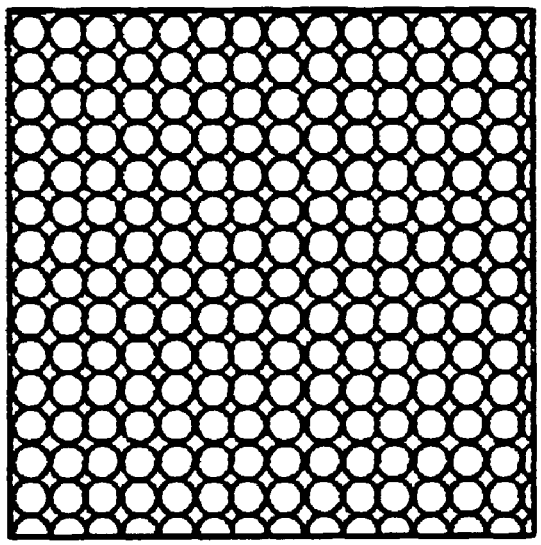
FIGS. 3A–3D show various fabricated membrane filters and their openings.
Figure 3B:
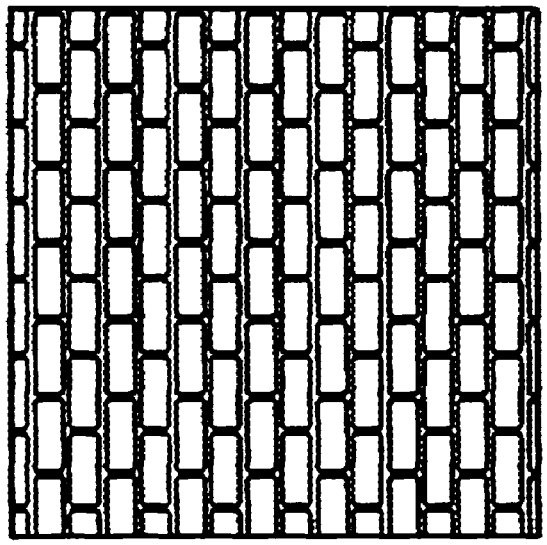
Figure 3C:
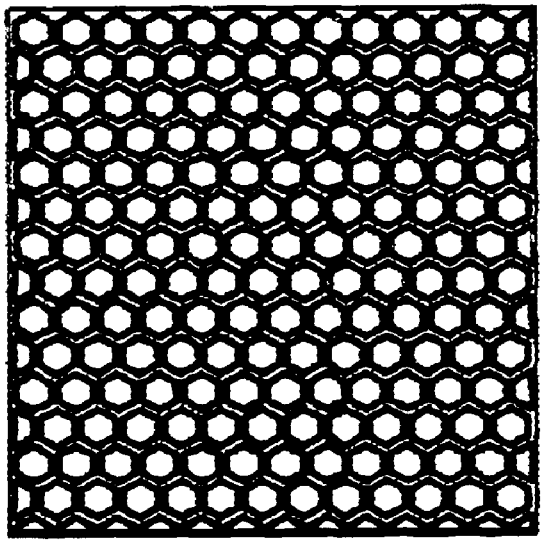
Figure 3D:
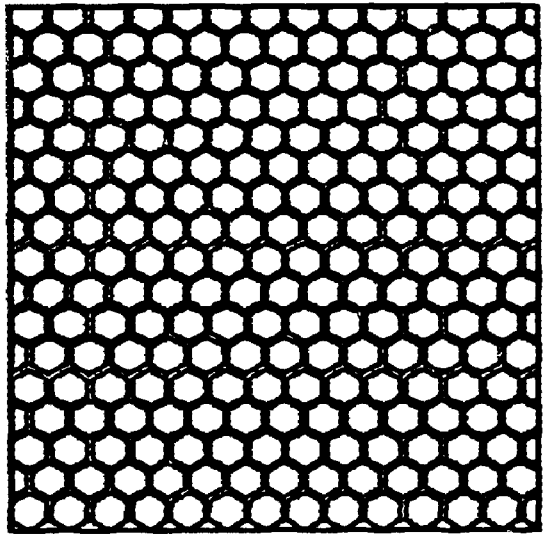

FIG. 3A shows a top view of a circular hole. FIG. 3B shows the rectangular hole, while FIGS. 3C and 3D respectively show the hexagonal holes for these filters.

FIG. 2 shows different characteristics for the filters. The far left side of the figure shows a top view of 8 millimeter×8 millimeter area. This is defined into different non-filtering regions and filtering regions.

TABLE 1 shows how the final Parylene coating layer increases the strength of the filters. Burst pressure of various membrane filters was tested using differential pneumatic pressure across the filter membrane. The first pressure of filter 6 in TABLE 1 was more than 4 times higher when coated with 2.69 microns of Parylene.

TABLE 1

Filter Strength
(Filter #6, β = 43.6%)

| Parylene Thickness ($\mu$m) | Burst Pressure (PSI) |
|---|---|
| 0 | 0.9 |
| 1.38 | 1.9 |
| 2.69 | 4.2 |

Figure 4:
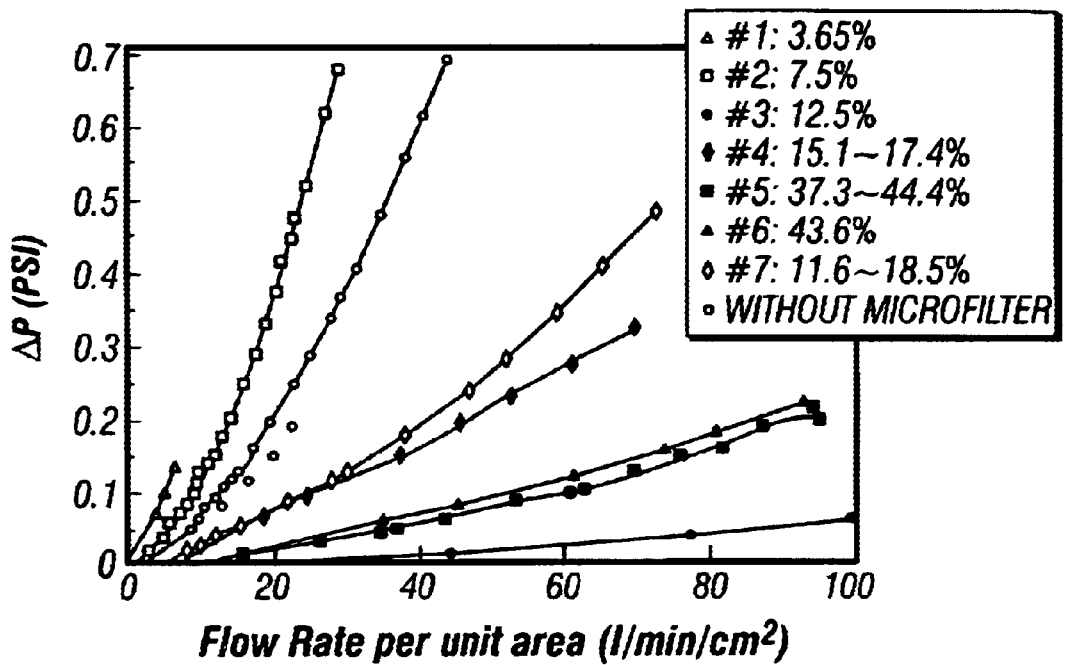
FIGS. 4 and 5 show different pressure drops as functions of the flow rate.
Figure 5:
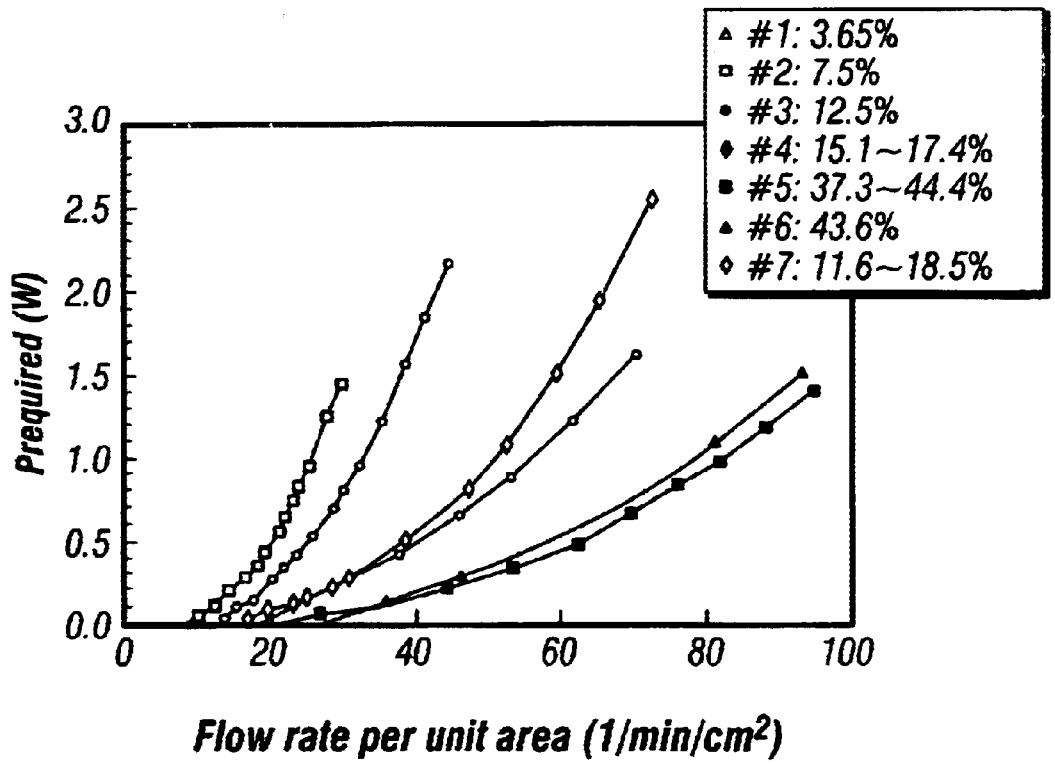

The fluid dynamic performance of the membrane filters was also tested, and the results are shown in FIGS. 4 and 5. Each of the pressure drops is a function of flow rate per unit area was fitted with a second order polynomial function. The power to sustain a desired flow rate is calculated by multiplying the pressure drop by the volumetric flow rate. Hence, these features show how the pressure drop across the microfilter and power requirement increase dramatically as the opening factor increases.

Although only a few embodiments have been disclosed in detail above, many modifications are possible in the preferred embodiment without undue experimentation.

What is claimed is:

1. A method of forming a micromachined particle filter, comprising:

forming a silicon derivative overlayer on a first side and a second side of a silicon substrate;

etching the second side of the silicon substrate opposite the first side to form a thinned portion of the silicon substrate;

subsequent to etching the second side, etching the silicon derivative overlayer on the first side to form holes in the silicon derivative overlayer, said holes of at least 10 $\mu$m across one portion thereof;

subsequent to etching the silicon derivative overlayer on the first side, further etching the second side to substantially remove silicon from the substrate below the holes; and depositing at least 2 $\mu$m of Parylene over remaining portions of the silicon derivative overlayer, including inner surfaces which define said holes, to form a Parylene coated membrane filter that has increased structural strength.

2. A method as in claim 1 wherein said silicon derivative is silicon nitride.

3. The method of claim 1, wherein forming a silicon derivative overlayer on the first and second side of the substrate comprises forming an overlayer between 0.5 and 1 $\mu$m thick on at least one of the first and second side.

4. The method of claim 1, wherein etching the second side to form a thinned portion of the silicon substrate comprises etching the second side to form a thinned portion between 20 and 100 $\mu$m thick.

5. A method of forming a micromachined particle filter, comprising:

obtaining a silicon substrate, with a silicon derivative overlayer on a first side and a second side of the silicon substrate;

etching the second side of the silicon substrate opposite the first side to form a thinned portion of the silicon substrate;

subsequent to etching the second side, etching the silicon derivative overlayer on the first side to form holes in the silicon derivative overlayer;

subsequent to etching the first side, further etching the second side to substantially remove silicon from the substrate below the holes to form a membrane with holes which are at least 10 $\mu$m across an extend thereof; and increasing a strength of the membrane with holes, by depositing at least 2 $\mu$m of Parylene over remaining portions of the silicon derivative overlayer, including inner surfaces which define said holes, to form a Parylene coated membrane filter that has increased structural strength.

6. A method as in claim 5 wherein said silicon derivative is silicon nitride.

7. A method as in claim 5 wherein said holes are circular.

8. A method as in claim 5 wherein said holes are rectangular.

9. A method as in claim 5 wherein said holes are hexagonal.

10. The method of claim 5, wherein obtaining a silicon substrate comprises obtaining a silicon derivative overlayer on the first and second side of the substrate having an overlayer between 0.5 and 1 $\mu$m thick on at least one of the first and second side.

11. The method of claim 5, wherein etching the second side to form a thinned portion of the silicon substrate comprises etching the second side to form a thinned portion between 20 and 100 $\mu$m thick.

* * * * *